INVENTOR.
Monroe W. Carroll

Patented Feb. 14, 1939

2,147,427

UNITED STATES PATENT OFFICE 2,147,427

HYDRAULIC TANK GAUGE MECHANISM

Monroe W. Carroll, Beaumont, Tex.

Application May 4, 1937, Serial No. 140,621

1 Claim. (Cl. 73—316)

This invention relates to a tank gauge mechanism.

The invention relates more particularly to a hydraulic tank gauge especially adapted for use on fuel tanks of motor vehicles, aeroplanes and the like although the gauge is adaptable for general use.

An object of the invention is to provide means for operating the gauge, said means including a float in the fuel tank and a pressure conduit connected into the coil of the gauge proper, the gauge coil and the conduit being filled with an operating fluid preferably a light oil and means whereby the buoyancy of the float will be rendered operative to create a pressure on the operating fluid whereby the gauge proper will be actuated in accordance with the quantity of fuel in the fuel tank.

It is another object of the invention to provide means whereby the float may be maintained inactive but may be released for operation in accordance with the will of the operator.

It is a further object of the invention to provide means for regulating the capacity of the pressure conduit containing the operating fluid in accordance with the variations in the volume of said operating fluid due to variation in the temperature thereof.

With the above and other objects in view the invention has particular relation to certain novel features of construction, operation and arrangement of parts, an example of which is given in this specification and illustrated in the accompanying drawings, wherein.

Figure 1:
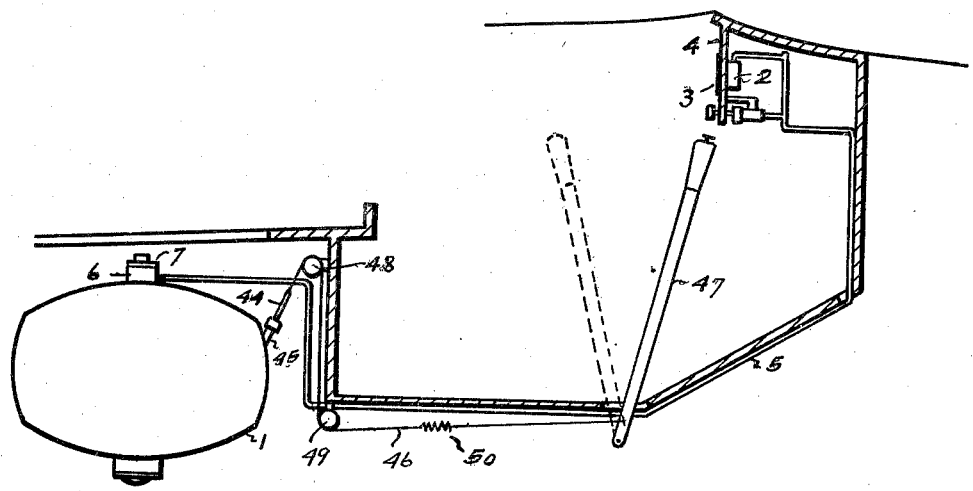
Figure 1 shows a side view of the complete apparatus as mounted on a motor vehicle.
Figure 3:
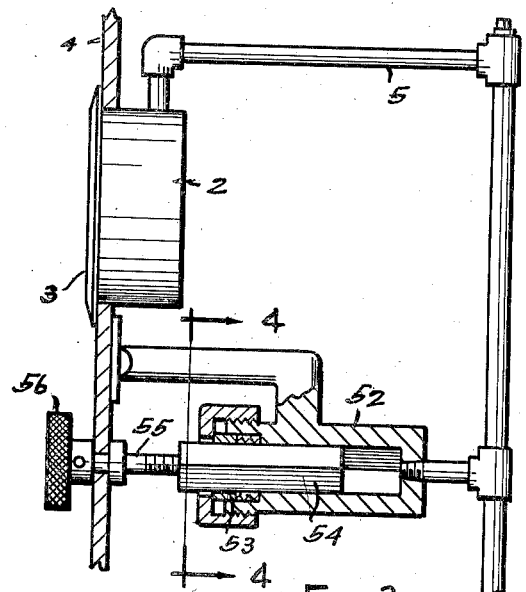
Figure 3 shows an enlarged fragmentary side elevation, shown partly in section.
Figure 6:
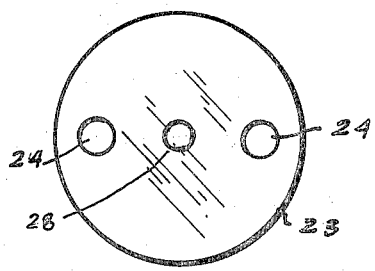
Figure 6 shows a plan view of the float.
Figure 4:
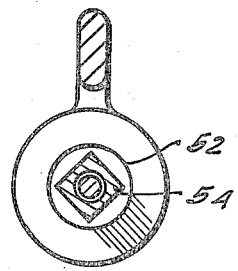
Figure 4 shows a vertical, sectional view taken on the line 4—4 of Figure 3.
Figure 7:
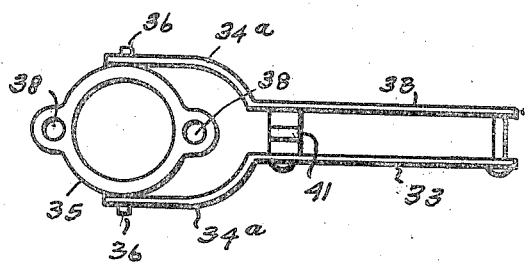
Figure 7 shows a plan view of the float controlling lever employed.

Referring now more particularly to the drawings wherein like numerals of reference designate similar parts in each of the figures, the numeral 1 designates the fuel containing tank which is of any conventional construction and the numeral 2 designates the gauge proper having the dial 3. The gauge 2 may be located at any convenient place. As shown, it is mounted on the instrument board 4 of the vehicle. An operating fluid line 5 is connected, at one end, into the top of the coil of the gauge 2 as shown in Figures 1 and 3.

On the tank 1 there is a hood 6 whose upper end may be closed by a removable cap 7 for ready access thereto. In assembly this hood is preferably fitted upwardly through a hole in the top of the tank and the lower end of the hood has a flange 8 which surrounds said opening and between said flange and the top of the tank there is a gasket 9 forming a fluid tight joint. The bottom of the tank has a relatively large opening 10 therein for ready access into the tank to permit the insertion and installation of the operating mechanism therein shown in Figure 2. Surrounding this opening there is a depending annular flange 11 and the lower end of the opening is enlarged forming an inside annular downwardly facing shoulder against which the annular plate 13 abuts. Spaced guide rods 14, 14 are located in the tank with their upper ends fitted through the flange 8 and the gasket 9 as well as through the top of the tank and said upper ends are outwardly threaded to receive the securing nuts 15, 15. The lower ends of these guide rods are fitted through openings in the plate 13 and are outwardly threaded to receive the nuts 16, 16 whereby said rods may be secured firmly in place and the plate 13 may be held clamped against the shoulder 12. The opening 10 is securely closed by a bottom plate 17 which is fastened to the lower margin of the depending flange 11.

The guide rods 14 are provided with the stops 18, 18 at a suitable elevation and mounted on these stops is the annular flange 19 which supports a cylinder 20. The upper end of this cylinder fits closely up into the hood 6 and said hood is provided with an internal, downwardly facing shoulder 21 arranged opposite the upper end of the cylinder with a suitable annular packing 22 interposed between the shoulder 21 and the opposing end of the cylinder forming a fluid tight joint. The lower end of the cylinder is countersunk into the supporting flange 19 whereby the cylinder is secured firmly in place.

The other end of the conduit 5 is connected into the hood 6, said hood forming in effect an extension of the cylinder.

There is a float 23 of any selected design and of a shape to fit into the opening 10 and to rest on the plate 13 when in inaction position. It has the spaced side openings 24, 24 which receive the guide rods 14, 14 loosely.

Figure 2:
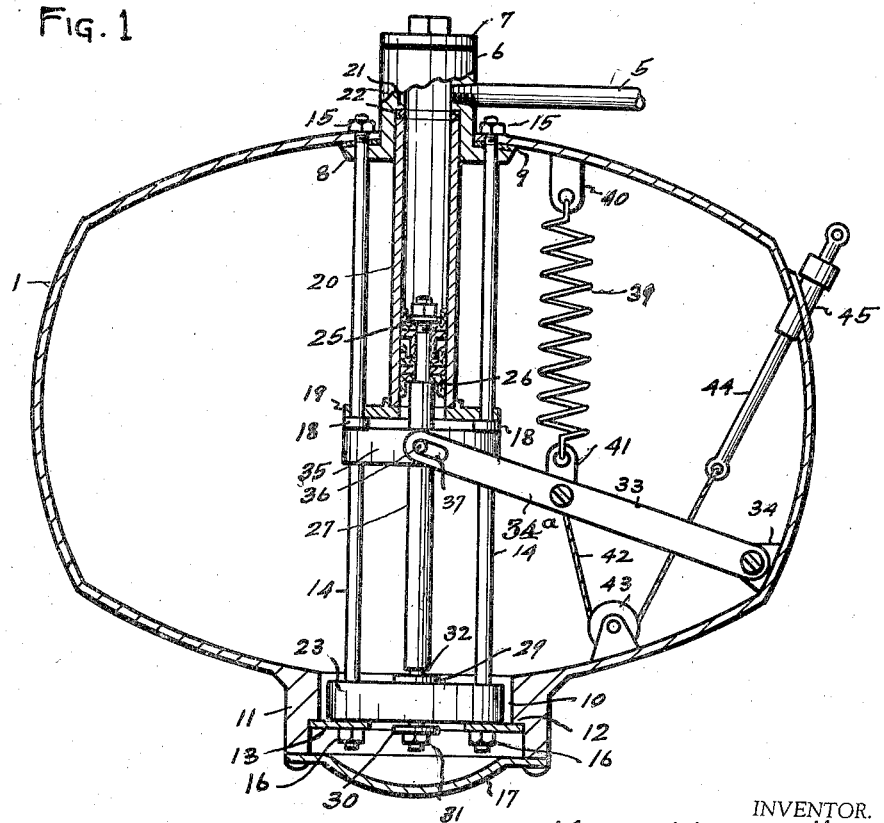
Figure 2 shows a cross-sectional view of the fuel tank showing the operating mechanism mounted therein partly in section.

In the cylinder there is a plunger formed with the upwardly and downwardly opening cups 25 and 26, respectively, which fit closely against the cylinder walls. The upper end of the plunger rod 27 is attached to the plunger and the lower end of said rod is reduced, as shown in Figure 2 and fitted through a central opening 28 through the float.

On the reduced lower end of the rod 27, above and beneath the float, are the washers 29, 30 and threaded onto the lower end of the stem 27 beneath the lower washer is the nut 31. Above the upper washer the stem is formed with an external, downwardly facing shoulder 32 against which the upper washer 29 engages to move the stem and plunger upwardly as the float moves upwardly. The openings 24 and 28 are somewhat larger than the guide rods 14 and the reduced portion of the stem, respectively, to prevent binding and to permit free movement of the float.

There are the spaced levers 33, 33 which are suitably anchored together and which are pivoted at their outer ends to a lug 34 on the inside of the tank 1. Their other ends are outwardly curved as at 34a and embrace the retaining ring 35. This ring has the oppositely disposed studs 36, 36 which work through oblong slots 37 of the levers 33. The ring 35 also has bearings 38, 38 which receive the guide rods 14 loosely.

A coiled pull spring 39 is connected at one end to a depending lug 40 in the top of the tank and at its other end to an upstanding lug 41 carried by the levers 33.

A cable 42 is attached at one end to the levers 33 and passes around a sheave 43 mounted in the bottom of the tank and the other end of the cable is attached to the lower end of a slidably mounted rod 44 which works closely through a sleeve-like bearing 45 extended through and secured to the tank wall.

An operating cable 46 is connected at one end to the outer end of the rod 44. The other end of this cable is connected to an operating lever 47 of the vehicle. This cable operates over suitable sheaves 48, 49 and has a yieldable section 50 incorporated therein to relieve the cable from excess tension.

Figure 5:
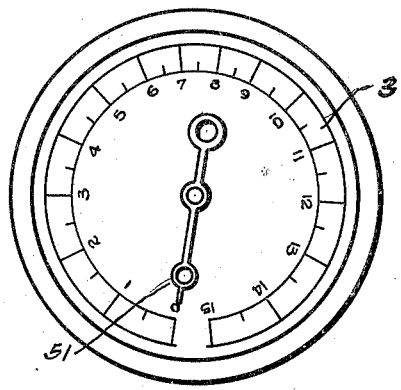
Figure 5 shows an elevational view of the gauge dial.

When the operating lever 47 is inactive the cable 46 will be under tension and will maintain the levers 33 and the retaining ring 35 in their lowermost position with the ring against the float to hold the float stationary. The tank 1, of course, will normally contain a quantity of liquid fuel. As stated the gauge coil of casing 2, the conduit 5 and the cylinder 20 will be filled with an operating fluid preferably a light lubricating oil which will lubricate the parts. When this operating fluid is at normal temperature the hand 51 of the gauge will stand at zero as shown in Figure 5. If the temperature of this operating fluid is appreciably raised the operating fluid will expand causing a corresponding actuation of the hand 51. It is necessary that provision be made for relieving the conduit 5 of the excess volume of the operating fluid due to the expansion from heat before attempting to guage the amount of the liquid in the tank 1. For this purpose a cylinder 52 has been provided which is connected at one end into the conduit 5. The other end of this cylinder is equipped with a stuffing box 53 through which a plunger 54 operates. This plunger is preferably polygonal in cross-sectional contour and the interior of the cylinder 52 is similarly shaped to prevent the turning of the plunger 54. An actuating rod 55 has a swiveling connection with the instrument board 4 and has a threaded connection with the plunger 54. The outer end of the rod 55 has a grip member 56 thereon accessible to the operator. If from heat the expansion of the operating fluid is sufficient to move the hand 51 from zero, when it is desired to test the quantity of liquid in the tank 1, the plunger 54 should be adjusted until the hand 51 stands at zero. The operating lever 47 may then be actuated to release the tension from the cable 46 whereupon the spring 39 will lift the retaining ring 35 from the float and permit the float to rise thus subjecting the operating fluid in the cylinder 20 to pressure from the plunger and this pressure will be transmitted to the gauge and will be indicated by the hand 51. The range of movement of the float will be regulated by the quantity of liquid in the tank 1 so that by an inspection of the gauge, under the conditions stated, the quantity of motive fluid in the tank can be at any time readily ascertained.

The conduit 5 is connected into the top of the coil of the gauge 2 to the end that said coil will at all times remain filled with the operating fluid.

The opening 10 is of sufficient size to readily admit the operating parts to be installed in said tank and to permit the work of installation.

The drawings and description disclose what is now considered to be a preferred form of the invention by way of illustration only, while the broad principle of the invention will be defined by the appended claim.

What I claim is:

In combination, a liquid containing tank having vertical guides, a gauge adapted to be actuated by an operating fluid, a cylinder depending into the tank, a conduit leading from the upper end of the cylinder and connected to the gauge, a cylinder connected with the conduit and having a relief chamber, a piston in the tank cylinder, a float in the tank mounted to move on said guides and connected to said piston for varying the pressure of the operating fluid, a manually operable plunger for varying the capacity of the relief chamber in accordance with variations in the volume of the operating fluid, retaining means on the guides for normally maintaining the float against movement and means for releasing the retaining means to permit movement of the float.

MONROE W. CARROLL.